United States Patent
Opipari et al.

(10) Patent No.: US 12,486,807 B1
(45) Date of Patent: Dec. 2, 2025

(54) ENGINE BRAKE SYSTEM FOR AN INTERNAL COMBUSTION ENGINE

(71) Applicant: GM Global Technology Operations LLC, Detroit, MI (US)

(72) Inventors: Anteo Carl Opipari, Saugatuck, MI (US); Paul Austin, Rockford, MI (US); Brian Joseph Warner, Hudsonville, MI (US); Rolando Huerta Ortiz, Grandville, MI (US); James Augustine Hazel, Caledonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/676,344

(22) Filed: May 28, 2024

(51) Int. Cl.
   *F02D 13/02* (2006.01)
   *F02D 13/04* (2006.01)

(52) U.S. Cl.
   CPC ......... *F02D 13/0276* (2013.01); *F02D 13/04* (2013.01)

(58) Field of Classification Search
   CPC .............................. F02D 13/0276; F02D 13/04
   See application file for complete search history.

(56) References Cited

U.S. PATENT DOCUMENTS

| | | |
|---|---|---|
| 4,395,884 A | 8/1983 | Price |
| 4,473,047 A | 9/1984 | Jakuba et al. |
| 4,836,162 A | 6/1989 | Melde-Tuczai et al. |
| 5,357,926 A | 10/1994 | Hu |
| 5,385,019 A | 1/1995 | Kulig et al. |
| 5,410,882 A | 5/1995 | Davies et al. |
| 5,437,156 A | 8/1995 | Custer |
| 6,866,017 B2 | 3/2005 | Ruggiero et al. |
| 7,162,996 B2 | 1/2007 | Yang |
| 7,284,533 B1 | 10/2007 | Huang et al. |
| 7,673,600 B2 | 3/2010 | Yang |
| 7,712,449 B1 | 5/2010 | Schwoerer |
| 7,823,553 B2 | 11/2010 | Meistrick |
| 7,971,569 B2 | 7/2011 | Meistrick et al. |
| 8,065,987 B2 * | 11/2011 | Yang ............. F02D 13/04 123/90.46 |
| 8,550,047 B2 | 10/2013 | Odell et al. |
| 9,371,780 B2 | 6/2016 | Toth et al. |
| 10,851,717 B2 | 12/2020 | Groth et al. |
| 11,542,877 B2 | 1/2023 | Lilly et al. |
| 2004/0035387 A1 | 2/2004 | Nelson et al. |
| 2010/0006062 A1 | 1/2010 | Yang |

(Continued)

FOREIGN PATENT DOCUMENTS

| | | |
|---|---|---|
| DE | 112009002211 B4 | 1/2022 |
| DE | 112021007080 T5 | 11/2023 |

*Primary Examiner* — Kevin A Lathers
(74) *Attorney, Agent, or Firm* — Honigman LLP; Matthew H. Szalach; Jonathan P. O'Brien

(57) ABSTRACT

An engine brake system, comprising a housing comprising a first passage extending along a first axis, a second passage extending along a second axis that intersects the first axis, the first passage in communication with the second passage. The engine brake system further comprises a pin arranged in the first passage and configured to translate along the first axis to hold open one or more valves of an internal combustion engine, a wedge arranged in the second passage and configured to translate along the second axis and engage with the pin, and a solenoid coupled to the wedge and configured to actuate the wedge along the second axis.

20 Claims, 4 Drawing Sheets

(56) References Cited

U.S. PATENT DOCUMENTS

| | | |
|---|---|---|
| 2010/0319657 A1 | 12/2010 | Dodi et al. |
| 2012/0024260 A1* | 2/2012 | Groth .................. F01L 1/26 |
| | | 123/321 |
| 2012/0048232 A1 | 3/2012 | Meistrick |
| 2014/0245992 A1 | 9/2014 | Groth et al. |
| 2017/0342872 A1* | 11/2017 | Martin .................. F01L 1/462 |
| 2019/0040772 A1 | 2/2019 | Lilly et al. |
| 2021/0095584 A1 | 4/2021 | Vanwingerden |
| 2022/0307430 A1 | 9/2022 | Göransson et al. |

* cited by examiner

ENGINE BRAKE SYSTEM FOR AN INTERNAL COMBUSTION ENGINE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to internal combustion engines and, more particularly, to an engine brake system for internal combustion engines.

Internal combustion engines typically employ mechanical, electrical or hydro-mechanical valve actuation systems to control the flow of combustible components, typically fuel and air, to one or more combustion chambers during operation. Such systems control the motion and timing of intake and exhaust valves during engine operation and may include a combination of camshafts, cam followers, rocker arms, push rods and other elements (such elements, in combination, constituting a valve train), which are driven by a rotating engine crankshaft. The timing of valve actuation may be fixed by the size and location of the lobes on the camshaft.

During positive power operation of internal combustion engines, for each full rotation (i.e., 360 degrees) of the camshaft, the engine sequentially completes an intake stroke, compression stroke, power or expansion stroke and then an exhaust stroke. During the intake stroke, intake valves are opened to admit fuel and/or air into a cylinder for combustion. During the compression stroke, both exhaust and intake valves are closed to permit compression by a piston of the air fuel mixture in the combustion chamber. The exhaust and intake valves remain closed as the compressed air/fuel mixture explodes forcing the piston downward in the expansion or power stroke. During the exhaust stroke, exhaust valves are subsequently opened to allow combustion products to escape the cylinder.

Vehicles can be equipped with a compression release engine brake to help slow vehicles during travel. In general, the compression release engine brake is configured to open exhaust valves to cylinders right before the compression stroke ends to release any compressed gas that may be trapped in the cylinders. Existing systems are complex and commonly rely on hydraulics to actuate the compression release engine brakes and hold open one or more exhaust valves during an engine braking event. Shortcomings of existing systems are addressed by one or more aspects of the present disclosure.

SUMMARY

In one configuration, an engine brake is provided and includes a housing having a first passage extending along a first axis, a second passage extending along a second axis that intersects the first axis. The first passage is in communication with the second passage. The engine brake further includes a pin arranged in the first passage and configured to translate along the first axis to hold open one or more valves of an internal combustion engine, a wedge arranged in the second passage and configured to translate along the second axis and engage with the pin, and a solenoid coupled to the wedge and configured to actuate the wedge along the second axis.

The engine brake may include one or more of the following optional aspects. For example, the housing can further include a main body defining the first passage and the second passage and a base extending from the main body and including one or more fastener openings.

According to at least one aspect, the pin can be movable between a first pin position and a second pin position with respect to the first axis. The pin can be disengaged with the one or more valves of the internal combustion engine in the first pin position and the pin can be engaged with the one or more valves in the second pin position.

According to another aspect, the engine brake can further include a valve bridge arranged between the pin and the one or more valves of the internal combustion engine.

According to at least one example, the wedge can be movable between a first wedge position and a second wedge position.

According to at least one aspect, the engine braking system is self-locking when the wedge departs from the first wedge position and the pin departs from the first pin position.

According to at least one aspect, the second passage can further include a first lip and a second lip extending toward each other along a third axis that intersects the first and second axes, the first lip and the second lip defining a first channel and a second channel. The wedge can further include a guide portion that is configured to translate within the first channel along the first lip and the second lip and an actuating surface that extends into the second channel and is configured to contact the pin.

According to another aspect, the second passage can define a cylindrical channel. The wedge can further include a cylindrical body including a first end and a second end opposite the first end. The wedge can include a tapered portion between the first end and the second end that defines an actuating surface that can be configured to contact the pin.

In another configuration, an internal combustion engine is provided and includes a cylinder head including one or more passages and one or more fastener openings and a valve train coupled to the cylinder head, including one or more intake valves, one or more exhaust valves, and one or more rocker arms coupled to the one or more intake valves and the one or more exhaust valves. The internal combustion engine further includes an engine brake coupled to the cylinder head and arranged with respect to the one or more exhaust valves, including a housing having a main body including a first passage extending along a first axis and a second passage extending along a second axis, a pin arranged in the first passage and configured to translate along the first axis to hold open the one or more exhaust valves, a wedge arranged in the second passage and configured to translate along the second axis and engage with the pin, and a solenoid coupled to the wedge and configured to actuate the wedge along the second axis.

The internal combustion engine may include one or more of the following optional aspects. For example, the pin can be movable between a first pin position and a second pin position with respect to the first axis. The pin can be disengaged with the one or more exhaust valves in the first pin position and the pin can be engaged with the one or more exhaust valves in the second pin position. The internal combustion engine can further include a valve bridge arranged between the pin and the one or more exhaust valves.

According to another aspect, the wedge can be movable between a first wedge position and a second wedge position.

The engine brake can be self-locking when the wedge departs from the first wedge position and the pin departs from the first pin position.

According to at least one example, the wedge can further include a first end and a second end opposite the first end with respect to the second axis, and a tapered portion arranged axially between the first end and the second end.

According to another configuration, an engine brake system is provided and includes a housing including a first passage and a second passage. The engine brake system further including a pin arranged in the first passage and configured to translate between a first pin position and a second pin position, a wedge arranged in the second passage and configured to translate between a first wedge position and a second wedge position, and a solenoid coupled to the wedge and configured to actuate the wedge between the first wedge position and the second wedge position. The engine brake system may be self-locking upon the wedge departing the first wedge position.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
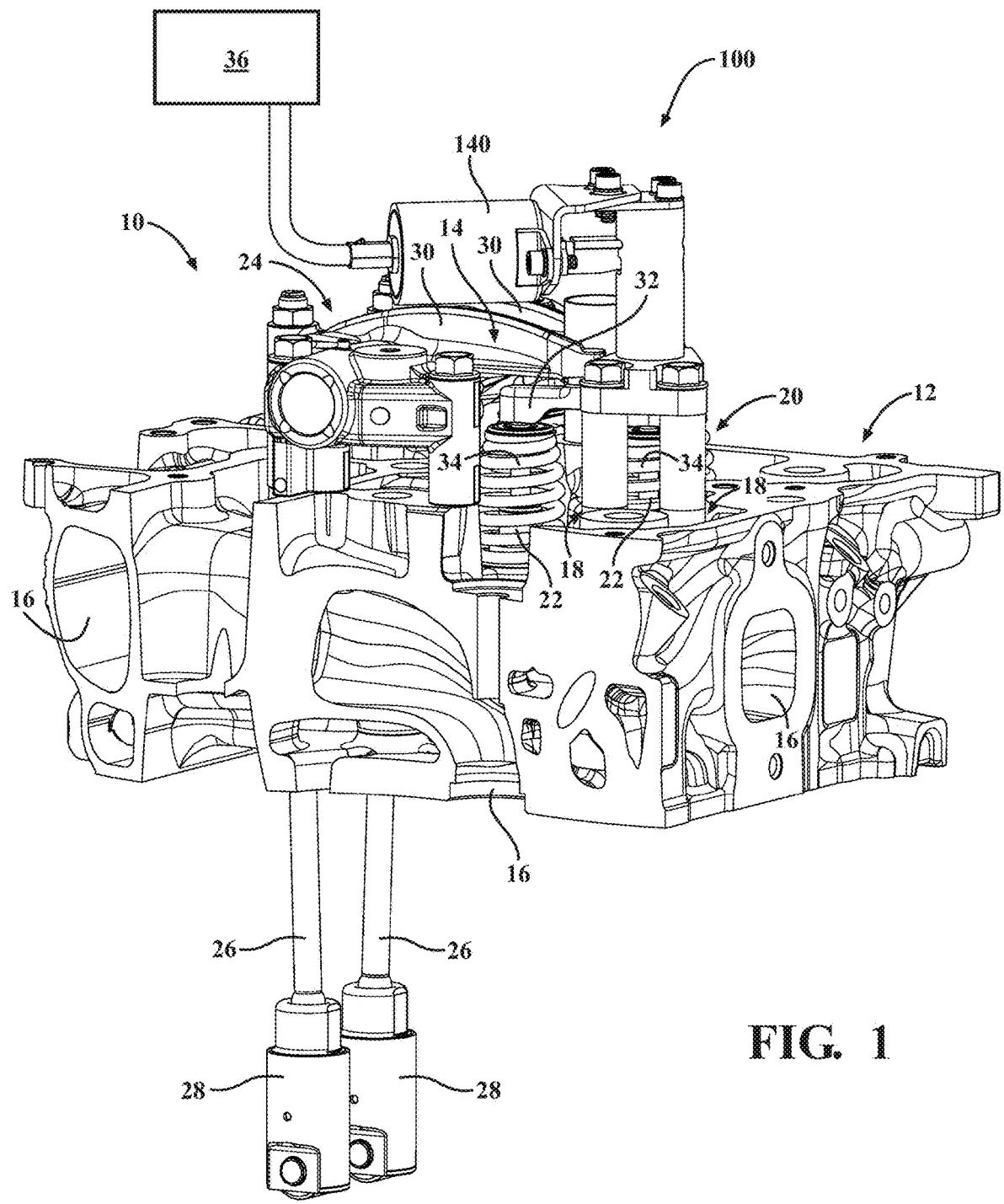
FIG. 1 is a perspective view of an engine brake system arranged on a cylinder head of an internal combustion engine according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors.

The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Engine braking can be desirable for releasing cylinder pressure through an exhaust valve during a compression stroke of a four-stroke internal combustion engine. In doing so, the engine 10 can enter an engine braking mode that includes a decrease in energy output of the engine 10, resistance of rotating and reciprocating components of the engine 10, and energy loss from the friction of the wheels. According to principles of the present disclosure, an engine brake is provided that is configured to capture the exhaust valve during the compression stroke of the engine cycle. Typically, there is about 5 to 12 milliseconds where the exhaust valve is at or above a desired lift that is necessary for engine braking to ensue. As will be discussed in detail below, the engine brake can be arranged with an actuation mechanism (e.g., a solenoid) for holding open one or more of the exhaust valves during one or more engine cycles.

With reference to FIG. 1, a portion of an internal combustion engine (hereinafter, engine) 10 is provided. The engine 10 includes a cylinder head 12 and a valve train 14 arranged on and/or coupled to the cylinder head 12. The cylinder head 12 includes one or more passages 16 and one or more fastener openings 18. The valve train 14 can be configured to control operation of one or more intake valves 20 and one or more exhaust valves 22. More specifically, the valve train 14 can include one or more rocker arms 24 for operating the valves 20, 22. The one or more rocker arms 24 can include a push rod 26 coupled to a tappet 28 at one end and a rocker 30 at another end. The rocker 30 can be coupled to the one or more exhaust valves 22 or intake valves 20 directly or indirectly (e.g., via a valve bridge 32). A camshaft (not shown) can be arranged to rotate with respect to and contact the tappets 28 of the rocker arms 24 to control the opening and/or closing of the valves 20, 22. The rocker arms 24 can also include one or more valve springs 34 that can facilitate closing the intake and exhaust valves 20, 22.

The engine 10 can further include an engine control module that includes one or more sub-controllers, such as an engine braking controller 36. As will be discussed in more detail below, the engine braking controller 36 can be configured to communicate with and control operation of an engine brake system 100 arranged on and/or coupled to the cylinder head 12.

Figure 2:
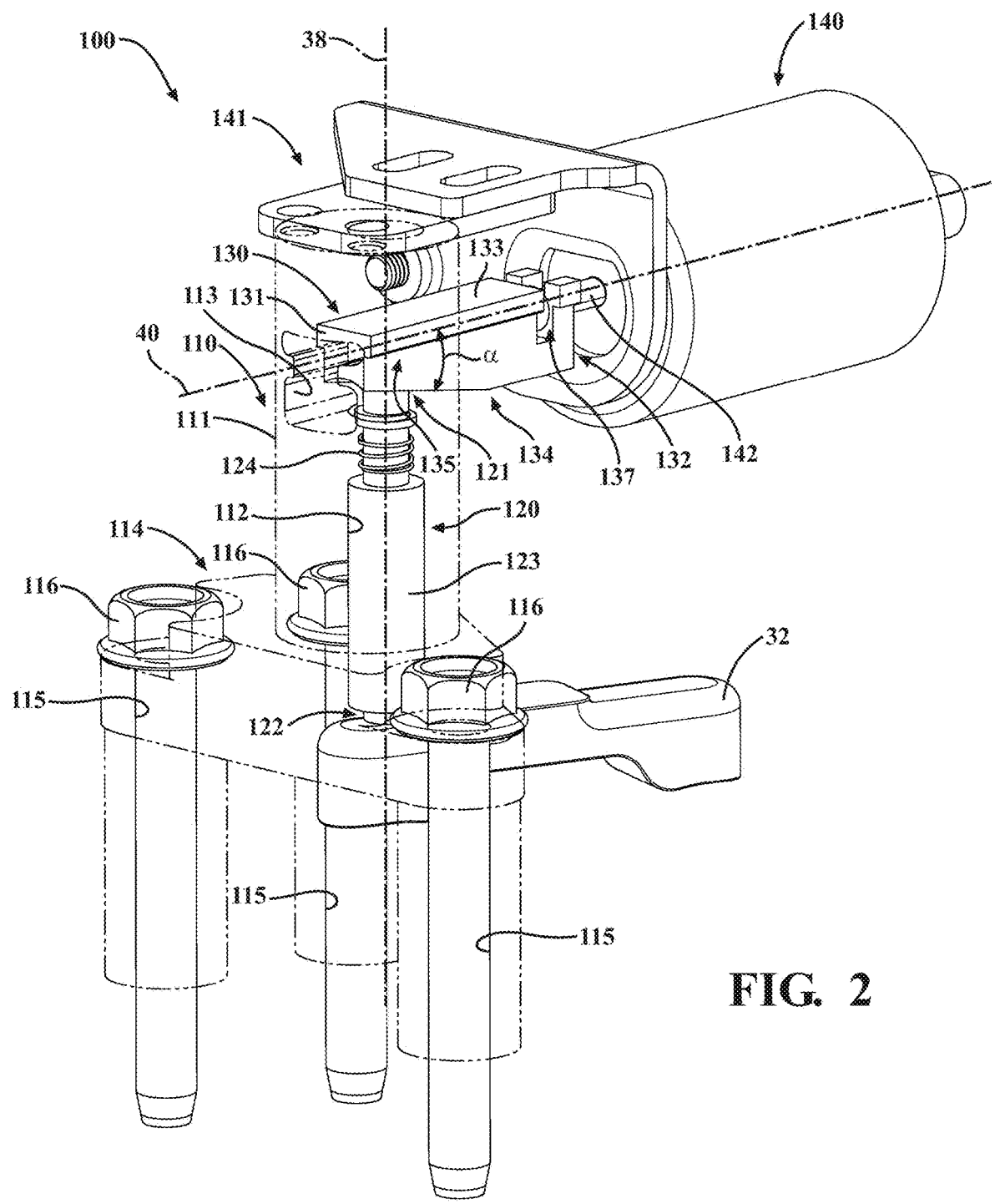
FIG. 2 is a perspective view of the engine brake system of FIG. 1.

The engine brake system 100 can be arranged over the valve bridge 32, as shown in FIGS. 1 and 2. In other configurations, the engine brake system 100 can be arranged towards an outside portion of the exhaust valves 22 or directly over the exhaust valves 22.

With reference to FIG. 2, the engine brake system 100 includes a housing 110 having a main body 111. The main body 111 can include a first or pin passage 112 extending along a first axis 38 and a second or wedge passage 113 extending along a second axis 40 that intersects the first axis 38. The first axis 38 and the second axis 40 can form an angle between 70 and 90 degrees, for example. In the present illustrative example, the first passage 112 is in communication with the second passage 113. The housing 110 can be configured to arrange one or more components of the engine brake system 100 with respect to the one or more exhaust valves 22 and/or the valve bridge 32. The housing 110 can have a base 114 coupled to the main body 111 and includes one or more fastener holes 115. As shown in FIG. 2, one or more bolts 116 can be arranged through the one or more fastener holes 115 and coupled to the one or more fastener openings 18 of the cylinder head 12. According to at least one aspect of the present disclosure, the bolts 116 can be selected and/or designed to withstand braking loads from the valve springs 34 and/or built up exhaust pressure of one or more cylinders (not shown) of the engine 10.

Figure 3:
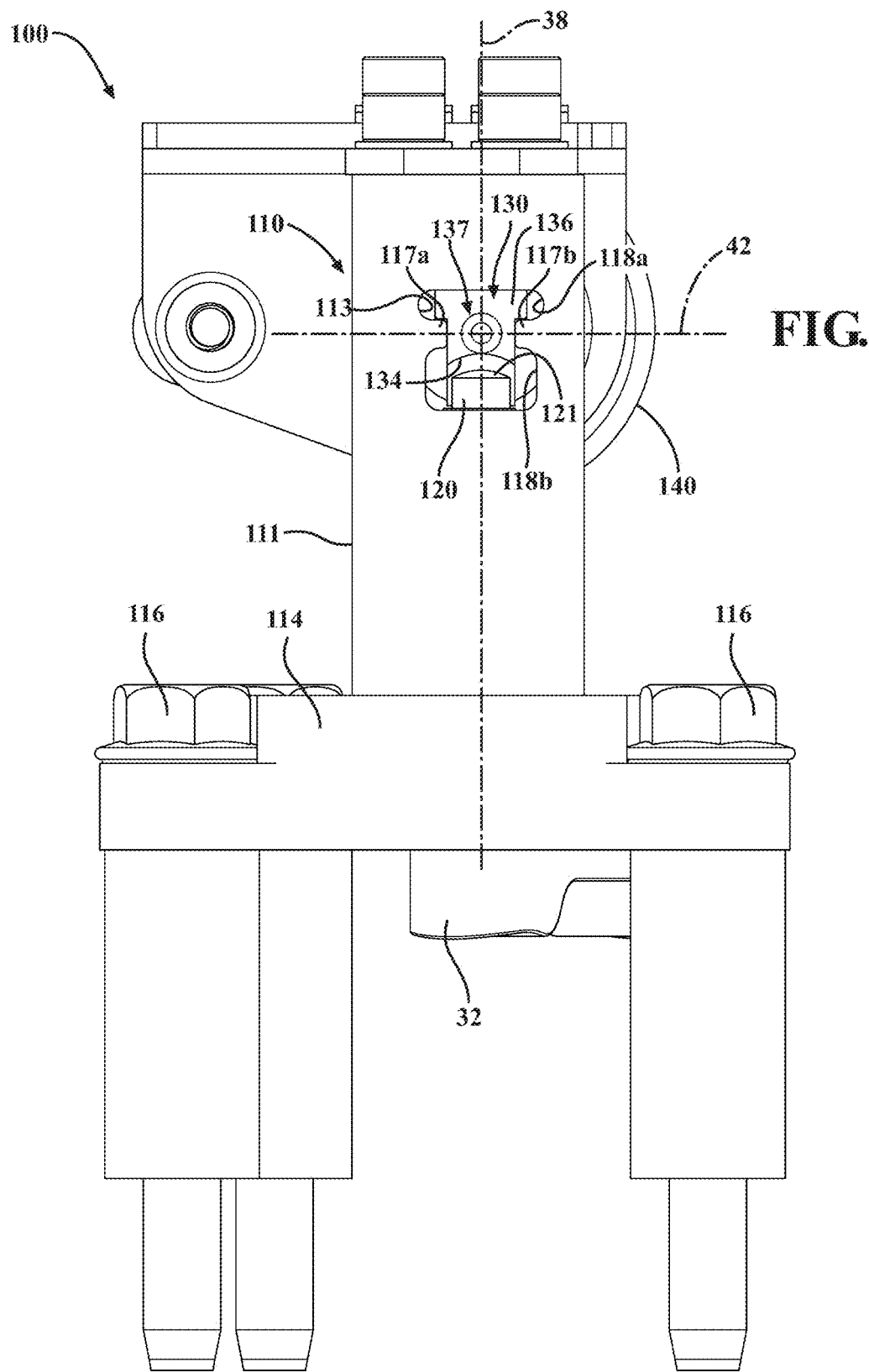
FIG. 3 is a side view of the engine brake system of FIG. 2 showing a rectangular wedge arranged in a passage according to the principles of the present disclosure.

With reference to FIG. 3, the second passage 113 can include a first lip 117a and a second lip 117b extending toward each other along a third axis 42 that intersects the first axis 38 and the second axis 40. The second passage 113 can also include a first channel 118a and a second channel 118b that are defined by the first and the second lips 117a, 117b. According to another configuration of the housing 110', with reference to FIG. 4, the second passage 113' can be defined by a cylindrical opening or channel 119.

With reference again to FIG. 2, the engine brake system 100 includes a pin 120 arranged in the housing 110 along the first axis 38. The pin 120 can include a first end 121 extending into a portion of the second passage 113 and a second end 122 opposite the first end 121 with respect to the first axis 38. The pin 120 can be configured to translate along the first axis 38 so that the second end 122 can extend beyond the housing 110 and engage with the valve bridge 32 or the one or more exhaust valves 22 to hold open at least one of the exhaust valves 22 during an engine braking event, for example. According to one aspect, a sleeve 123 can be arranged in the first passage 112 that can receive the pin 120. In another configuration, the pin 120 can be arranged in first passage without the sleeve 123. In the present illustrative example, the pin 120 is arranged within the sleeve 123 so that it can move axially with respect to the housing 110 and the sleeve 123. According to one aspect, the pin 120 can move axially between a first pin position where the pin 120 is disengaged with the valve bridge 32 or the one or more exhaust valves 22 and a second pin position where the pin 120 is engaged with the valve bridge 32 or the one or more exhaust valves 22. A return spring 124 can be arranged axially along the pin 120 to bias the pin 120 away from the valve bridge 32 and/or the one or more exhaust valves 22. The return spring 124 may be desirable for maintaining the pin 120 in the first pin position during normal engine operation and/or returning the pin 120 to the first pin position after an engine braking event.

With continued reference to FIG. 2, the engine brake system 100 can include a wedge 130 that is arranged in the second passage 113. The wedge 130 includes a first end 131 that extends into the second passage 113 of the housing 110 and a second end 132 opposite the first end 131. An upper surface 133 and a lower or actuating surface 134 both extend between the first end 131 and the second end 132 of the wedge 130. The lower surface 134 can be concave or otherwise configured to engage with and/or contact the first end 121 and actuate the pin 120 along the first axis 38. Additionally, the wedge 130 can include a tapered region 135 between the first end 131 and the second end 132 that forms an angle α with the second axis 40. As will be discussed below, the angle α can be configured so that the wedge 130 is self-locking during an engine braking event.

According to one configuration, with reference to FIG. 3, the wedge 130 can include a guide portion 136 that is configured to translate within the first channel 118a along the first lip 117a and the second lip 117b. As shown in FIG. 3, the lower surface 134 can be arranged laterally between the first lip 117a and the second lip 117b and extend from the guide portion 136 into the second channel 118b to contact the first end 121 of the pin 120.

Figure 4:
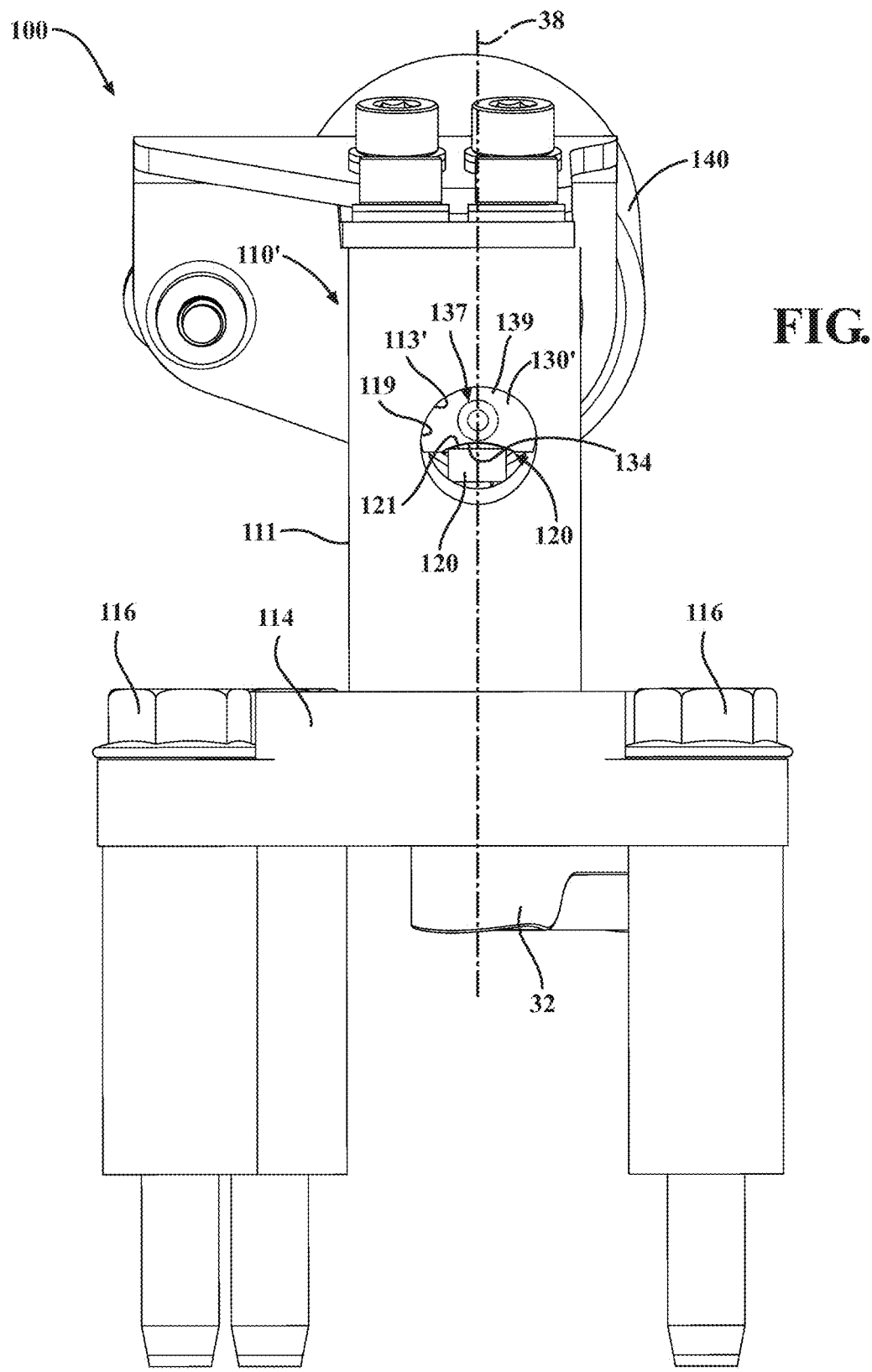
FIG. 4 is a side view of another configuration of an engine brake system showing a circular wedge arranged in a passage according to the principles of the present disclosure.

According to another configuration, with reference to FIG. 4, the wedge 130' can include a cylindrical portion 139 that is arranged in the cylindrical opening 119 of the housing 110'.

According to at least one aspect, the wedge 130, 130' can be configured to translate along the second axis 40 between a first wedge position and a second wedge position. The wedge 130, 130' is in the first wedge position when the pin 120 is adjacent to and/or contacting the wedge 130, 130' at the first end 131. Upon actuation of the wedge 130, 130', discussed in more detail below, the wedge 130, 130' can gradually move away from the first wedge position where the pin 120 contacts the lower surface 134 of the wedge 130, 130' between the first end 131 and the second end 132. As introduced above, the wedge 130, 130' can be configured to be self-locking. In other words, when the wedge 130, 130' departs the first wedge position, the force of the valve spring 34 and the exhaust pressure from one or more cylinders of the engine 20 acts on the wedge 130, 130' and maintains the axial position of the wedge 130, 130' so that the wedge 130, 130' does not retract to the first wedge position during an engine braking event.

As shown in FIGS. 2, 3, and 4, the wedge 130, 130' can include a lash mechanism 137 that includes screws or nuts. Alternatively, the lash mechanism 137 (e.g., slots) can be arranged on a bracket 141 that supports the solenoid 140 with respect to the housing 110. The lash mechanism 137 can be adjusted during installation and/or service intervals to control the position of the wedge 130, 130' with respect to an actuation mechanism, such as a solenoid 140.

With reference to FIG. 2 the solenoid 140 can be arranged on and/or coupled to the housing 110. The solenoid 140 includes an actuating arm 142 that is movable along the second axis 40. Additionally, the solenoid 140 can include a wedge return spring (not shown) contained in an armature cavity of the solenoid 140. The bracket 141 can be coupled to the housing 110 and the solenoid 140 to axially align the actuating arm 142 with the second end 132 of the wedge 130, for example.

In operation, during normal engine operation, the pin 120 contacts the wedge 130 near the first end 131 and is spaced axially from the valve bridge 32 and/or the one or more exhaust valves 22. When engine braking is initiated (e.g., manually via the driver, automatically via a control module, etc.), the engine braking controller 36 can be configured to communicate with and/or provide instructions to the solenoid 140 to drive the wedge 130 axially along the second axis 40. The axial movement of the wedge 130 pushes the wedge 130 from the first wedge position toward the second wedge position which simultaneously actuates the pin 120 toward the valve bridge 32 and/or toward the one or more exhaust valves 22. According to one aspect, the pin 120 can be driven by the wedge 130 while the valve bridge 32 is already pushed down by the rocker arm 24. In other words, no force is required to overcome the force of the valve spring 34 and/or the exhaust back pressure of a cylinder (not shown) of the engine 10. As the pin 120 gradually reaches the second pin position, it will continuously impede axial movement of the valve bridge 32 and/or the one or more exhaust valves 22 and thus, keep the exhaust valve 22 open.

According to another aspect, the timing of the solenoid 140 does not need to be precise. In general, the full opening (e.g., 1 mm) of the exhaust valve 22 does not need to occur in one camshaft revolution of the engine 10. The engine brake system 100 can be configured to allow additional motion of the wedge 130, 130' and the pin 120 during subsequent camshaft revolutions since the wedge 130, 130' can be configured to be self-locking (i.e., will not retreat to the first wedge position until the engine braking event has concluded). Once the wedge 130, 130' departs the first position, some degree of engine braking will ensue. A varying degree of engine braking can occur as the wedge 130, 130' moves between first wedge position and the second wedge position and the pin 120 moves between the first pin position and the second pin position. In fact, under certain conditions, an intermediate position of the wedge 130, 130' and pin 120 between their respective first and second positions may be desirable.

When the engine braking controller 36 disables or inhibits engine braking, the solenoid 140 is de-energized and begins to pull the wedge 130 toward the first wedge position via the wedge return spring (not shown) contained in the armature cavity of the solenoid 140. As the wedge 130 returns to the first wedge position, the pin 120 can simultaneously return to the first pin position. The pin return spring 124 can move the pin 120 off of the valve bridge 32 and/or the one or more exhaust valves 22 so that no portion of the pin 120 is in contact with the valve bridge 32 and/or the one or more exhaust valves 22.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An engine brake system, comprising:
    a housing, comprising:
        a first passage extending along a first axis,
        a second passage extending along a second axis that intersects the first axis, and
        wherein the first passage is in communication with the second passage;
    a pin arranged in the first passage and configured to translate along the first axis to hold open one or more valves of an internal combustion engine;
    a wedge arranged in the second passage and configured to translate along the second axis and engage with the pin; and
    a solenoid coupled to the wedge and configured to actuate the wedge along the second axis.

2. The engine brake system of claim 1, wherein the housing further comprises a main body defining the first passage and the second passage and a base extending from the main body and including one or more fastener holes.

3. The engine brake system of claim 1, wherein the pin is movable between a first pin position and a second pin position with respect to the first axis.

4. The engine brake system of claim 3, wherein the pin is disengaged with the one or more valves of the internal combustion engine in the first pin position and the pin is engaged with the one or more valves in the second pin position.

5. The engine brake system of claim 4, further comprising a valve bridge arranged between the pin and the one or more valves of the internal combustion engine.

6. The engine brake system of claim 4, wherein the wedge is movable between a first wedge position and a second wedge position.

7. The engine brake system of claim 6, wherein the wedge is configured to be engaged by a valve train that prevents the wedge from returning to the first wedge position after the wedge departs from the first wedge position and the pin departs from the first pin position.

8. The engine brake system of claim 1, wherein the second passage further comprises a first lip and a second lip extending toward each other along a third axis that intersects the first and second axes, the first lip and the second lip defining a first channel and a second channel.

9. The engine brake system of claim 8, wherein the wedge further comprises a guide portion that is configured to translate within the first channel along the first lip and the second lip and an actuating surface that extends into the second channel and is configured to contact the pin.

10. The engine brake system of claim 1, wherein the second passage defines a cylindrical channel.

11. The engine brake system of claim 10, wherein the wedge further comprises a cylindrical body comprising a first end and a second end opposite the first end.

12. The engine brake system of claim 11, wherein the wedge comprises a tapered portion between the first end and the second end that defines an actuating surface that is configured to contact the pin.

13. An internal combustion engine, comprising:
    a cylinder head comprising one or more passages and one or more fastener openings;
    a valve train coupled to the cylinder head, comprising:
        one or more intake valves, one or more exhaust valves, and one or more rocker arms coupled to the one or more intake valves and the one or more exhaust valves; and an engine brake coupled to the cylinder head and arranged with respect to the one or more exhaust valves, comprising:

a housing, comprising:

a main body having a first passage extending along a first axis and a second passage extending along a second axis, a pin arranged in the first passage and configured to translate along the first axis to hold open the one or more exhaust valves, a wedge arranged in the second passage and configured to translate along the second axis and engage with the pin, and a solenoid coupled to the wedge and configured to actuate the wedge along the second axis.

14. The internal combustion engine of claim 13, wherein the pin is movable between a first pin position and a second pin position with respect to the first axis.

15. The internal combustion engine of claim 14, wherein the pin is disengaged with the one or more exhaust valves in the first pin position and the pin is engaged with the one or more exhaust valves in the second pin position.

16. The internal combustion engine of claim 15, further comprising a valve bridge arranged between the pin and the one or more exhaust valves.

17. The internal combustion engine of claim 15, wherein the wedge is movable between a first wedge position and a second wedge position.

18. The internal combustion engine of claim 17, wherein the valve train prevents the wedge from returning to the first wedge position after the wedge departs from the first wedge position and the pin departs from the first pin position.

19. The internal combustion engine of claim 13, wherein the wedge further comprises a first end and a second end opposite the first end with respect to the second axis, and a tapered portion arranged axially between the first end and the second end.

20. An engine brake system, comprising:

a housing including a first passage and a second passage;

a pin arranged in the first passage and configured to translate between a first pin position and a second pin position;

a wedge arranged in the second passage and configured to translate between a first wedge position and a second wedge position, the wedge being configured to be engaged by a valve train that prevents the wedge from returning to the first wedge position after the wedge departs from the first wedge position and the pin departs from the first pin position; and a solenoid coupled to the wedge and configured to actuate the wedge between the first wedge position and the second wedge position.

\* \* \* \* \*